(12) United States Patent
Takaoka et al.

(10) Patent No.: US 8,267,467 B2
(45) Date of Patent: Sep. 18, 2012

(54) REINFORCEMENT FOR CAB IN CONSTRUCTION MACHINE

(75) Inventors: Tetsuji Takaoka, Akashi (JP); Eiji Akahane, Kako-gun (JP); Kazushige Tasaki, Kakogawa (JP); Masayoshi Nakajima, Akashi (JP); Teruyuki Yamada, Kako-gun (JP); Yusuke Harayama, Onomichi (JP); Tomoya Hirano, Onomichi (JP)

(73) Assignees: Caterpillar Japan Ltd., Tokyo (JP); Press Kogyo Co., Ltd., Kawasaki-Shi (JP)

( * ) Notice: Subject to any disclaimer, the term of this patent is extended or adjusted under 35 U.S.C. 154(b) by 0 days.

(21) Appl. No.: 13/265,261

(22) PCT Filed: Dec. 15, 2009

(86) PCT No.: PCT/JP2009/006876
§ 371 (c)(1),
(2), (4) Date: Oct. 19, 2011

(87) PCT Pub. No.: WO2010/122623
PCT Pub. Date: Oct. 28, 2010

(65) Prior Publication Data
US 2012/0038186 A1    Feb. 16, 2012

(30) Foreign Application Priority Data

Apr. 22, 2009   (JP) ................................. 2009-103796

(51) Int. Cl.
   *B60J 7/00* (2006.01)
(52) U.S. Cl. .................................... 296/190.08; 296/30
(58) Field of Classification Search .................... 296/30, 296/190.08; 52/657; 403/270, 271, 272
See application file for complete search history.

(56) References Cited

U.S. PATENT DOCUMENTS

| 6,032,980 A * | 3/2000 | Rapp et al. ..................... 280/756 |
| 6,065,799 A * | 5/2000 | Suwabe et al. ............ 296/190.04 |
| 2008/0238144 A1 | 10/2008 | Kamimae |

FOREIGN PATENT DOCUMENTS

| JP | A-2004-148859 | 5/2004 |
| JP | A-2007-131263 | 5/2007 |
| JP | A-2008-238876 | 10/2008 |

OTHER PUBLICATIONS

Jan. 19, 2010 International Search Report issued in PCT/JP2009/006876 (with translation).

* cited by examiner

*Primary Examiner* — Joseph Pape
(74) *Attorney, Agent, or Firm* — Oliff & Berridge, PLC

(57) ABSTRACT

A cab in a construction machine, the cab including frame members including a hollow first frame member connected to a second frame member in order to form a corner portion, the first frame member including a pass-through portion formed at a first side surface portion of the first frame member; a reinforcing member that is installed at the corner portion, wherein at least one of two sides of the reinforcing member passes through the pass-through portion and abuts against an inner surface of a second side surface portion of the first frame member that is at an opposite side of the first side surface portion; and a reinforcing plate that abuts against an outer surface of the second side surface portion, wherein the at least one of two sides of the reinforcing member is supported and reinforced by the reinforcing plate.

3 Claims, 5 Drawing Sheets

REINFORCEMENT FOR CAB IN CONSTRUCTION MACHINE

CROSS-REFERENCE TO RELATED APPLICATIONS

This application is the U.S. National Phase of PCT/JP2009/006876, filed Dec. 15, 2009, which claims priority from Japanese Patent Application No. 2009-103796, filed Apr. 22, 2009 the entire disclosure of which is incorporated herein by reference hereto.

BACKGROUND

The present disclosure relates to a cab reinforcement in construction machines.

A cab can be mounted on a travelling vehicle of a construction machine such as a hydraulic shovel and the like. The cab can be framed by using frame members, which include column members and beam members such as a roof portion and a floor portion. The cab can be reinforced by placing a triangular platy reinforcement into a right-angled corner that is formed between adjacent frame members. The reinforcement is designed to protect a user in the event of over-turning or toppling of the traveling vehicle at unstable worksites (see Japanese Published Unexamined Patent Application No. 2007-131263, for example).

SUMMARY

However, the conventional reinforcement has apex portions in line contact with the respective frame members by a thickness of a plate portion of the reinforcement. The frame members are prone to be weakened and buckled around the apex portions of the reinforcement. This occurs because the frame members are likely to be subject to a load in a state where load stress is concentrated at the apex portions of the reinforcement when the load acts in a direction of decreasing an angle between adjacent frame members. The present disclosure intends to solve the problems and achieves various advantages.

The present disclosure has been made with the object of resolving the above problems in view of the above circumstances, and a first exemplary aspect of the present disclosure provides a cab in a construction machine, the cab including frame members including a hollow first frame member connected to a second frame member in order to form a corner portion, the first frame member including a pass-through portion formed at a first side surface portion of the first frame member; a reinforcing member that is installed at the corner portion, wherein at least one of two sides of the reinforcing member passes through the pass-through portion and abuts against an inner surface of a second side surface portion of the first frame member that is at an opposite side of the first side surface portion; and a reinforcing plate that abuts against an outer surface of the second side surface portion, wherein the at least one of two sides of the reinforcing member is supported and reinforced by the reinforcing plate.

A second exemplary aspect of the present disclosure provides the cab according to the first exemplary aspect, in which the reinforcing plate is a floor plate, the first frame member is a lower beam member that contacts with the floor plate from an upper side of the floor plate, and the second frame member is a column member that erects from the floor plate.

A third exemplary aspect of the present disclosure provides the cab according to the first or second exemplary aspect, in which the at least one of two sides of the reinforcing member includes a bent surface portion that is orthogonally bent from a plate surface of the reinforcing member and is in contact with the second side surface portion.

According to the first exemplary aspect, when a load acts in a direction of a decreasing corner angle between the adjacent frame members, the one side of the reinforcing member, which passes through the frame member, is supported by the reinforcing plate via the surface portion at the opposite side of the surface portion of the frame member in which the pass-through portion is formed. Although the frame member is hollow with lower strength, in which the pass-through portion is formed, the frame member is protected and prevented from being buckled, and the cab is increased in strength.

According to the second exemplary aspect, the lower beam member is prevented from being buckled by effectively using the floor plate, which is a component of the cab, without preparing any additional reinforcing plate and increasing a number of components.

According to the third exemplary aspect, the reinforcing plate supports widely utilizing the bent surface portion of the reinforcing member that passes through, which allows load stress to be dispersed, with a resultant contribution to increase in strength of the cab.

BRIEF DESCRIPTION OF THE DRAWINGS

Various embodiments will be described with reference to the drawings, wherein.

DETAILED DESCRIPTION OF EMBODIMENTS

Figure 1:
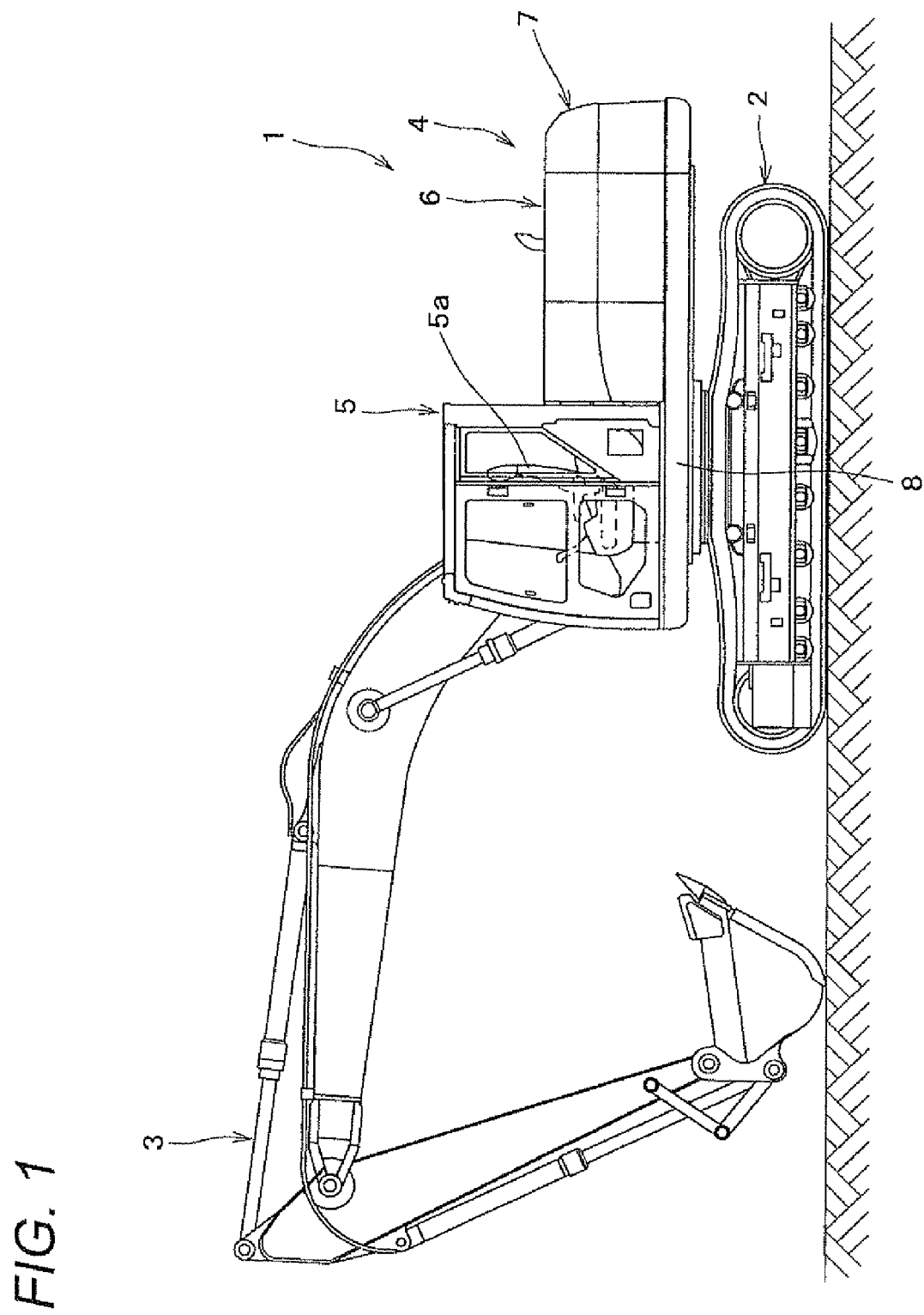
FIG. 1 is an overall side view of a hydraulic shovel.
Figure 2:
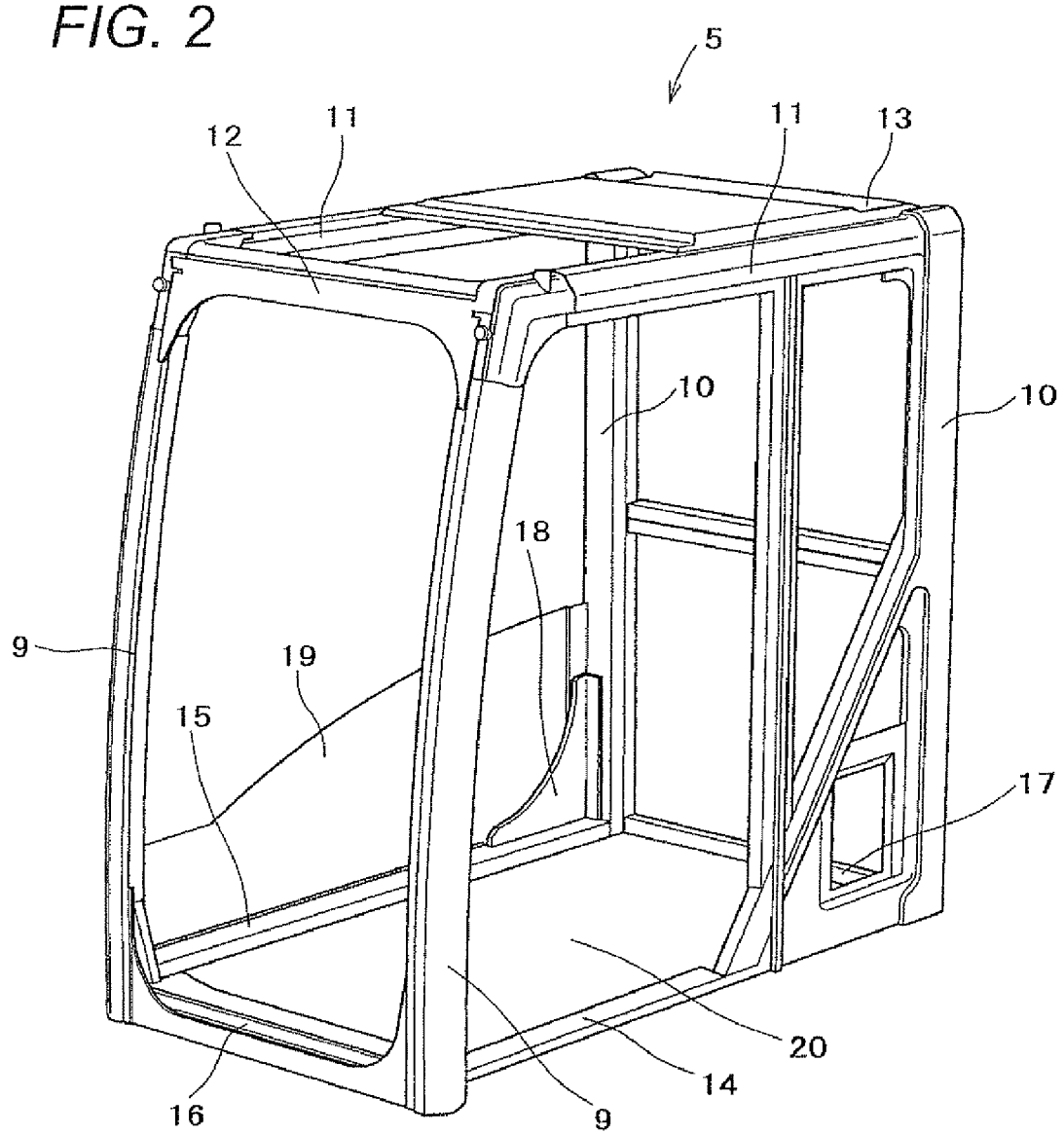
FIG. 2 is a perspective view of a cab framework.
Figure 3:
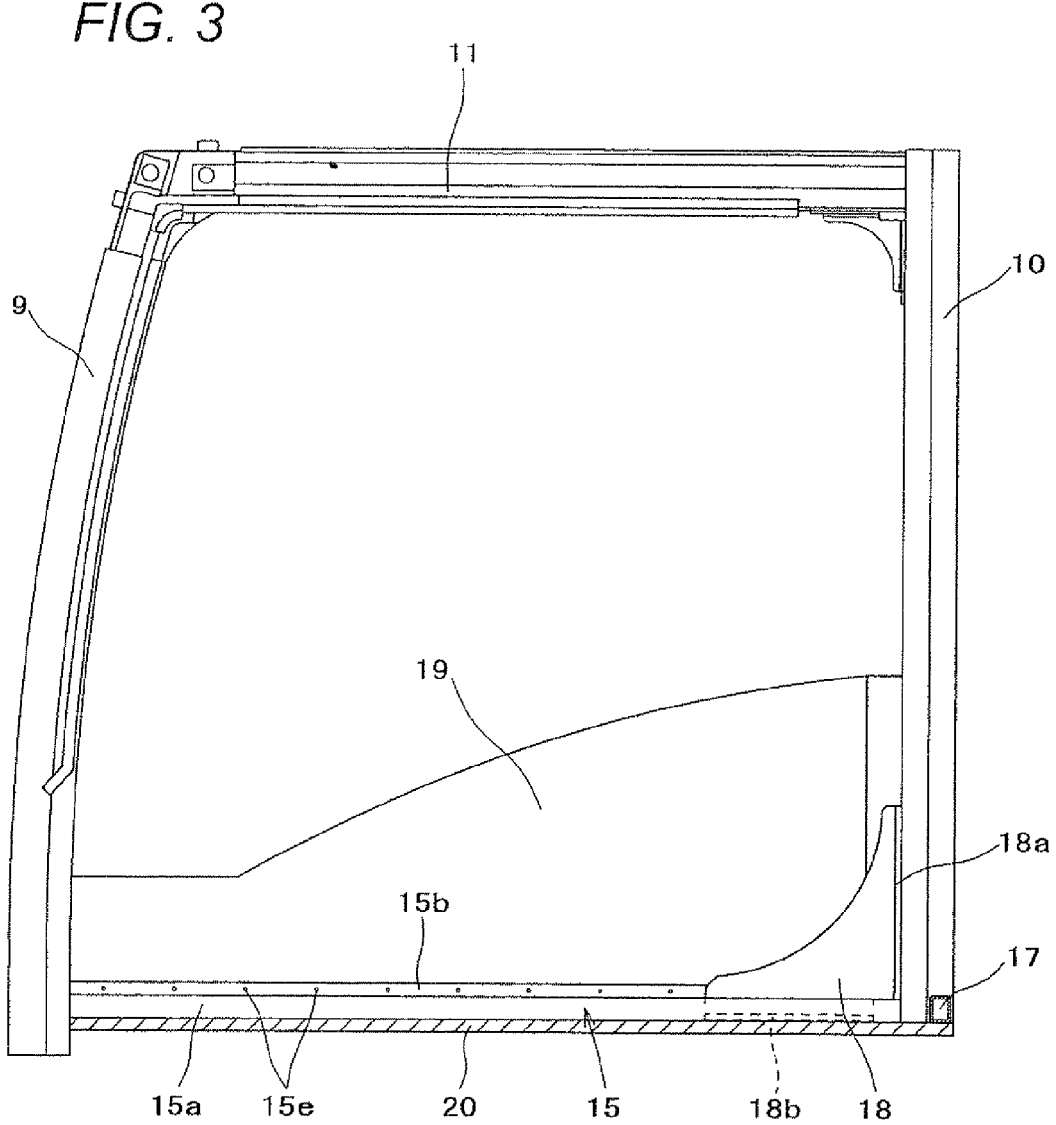
FIG. 3 is a sectional view of a reinforced region of the cab framework.
Figure 4A:
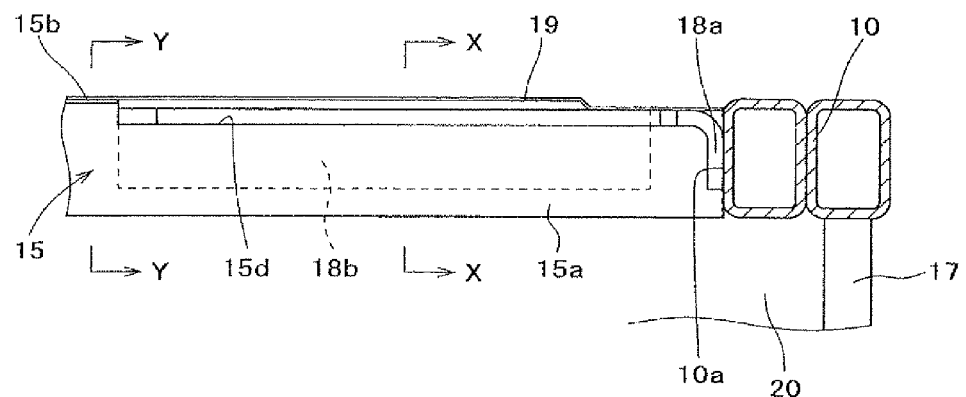
FIG. 4A is a partial planar sectional view of a reinforced region of the cab.
Figure 4B:
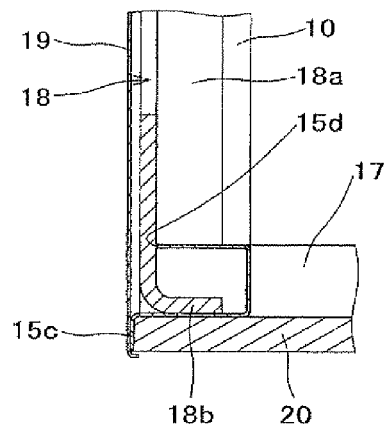
FIG. 4B is a sectional view taken along X-X in FIG. 4A.
Figure 4C:
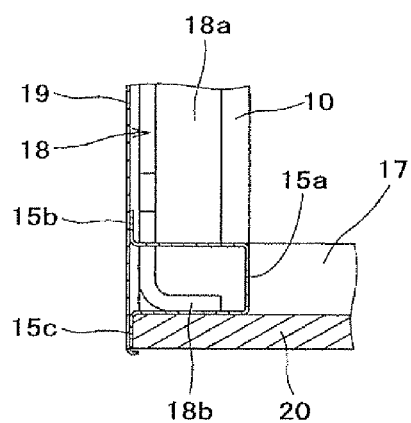
FIG. 4C is a sectional view taken along Y-Y in FIG. 4A.
Figure 5A:
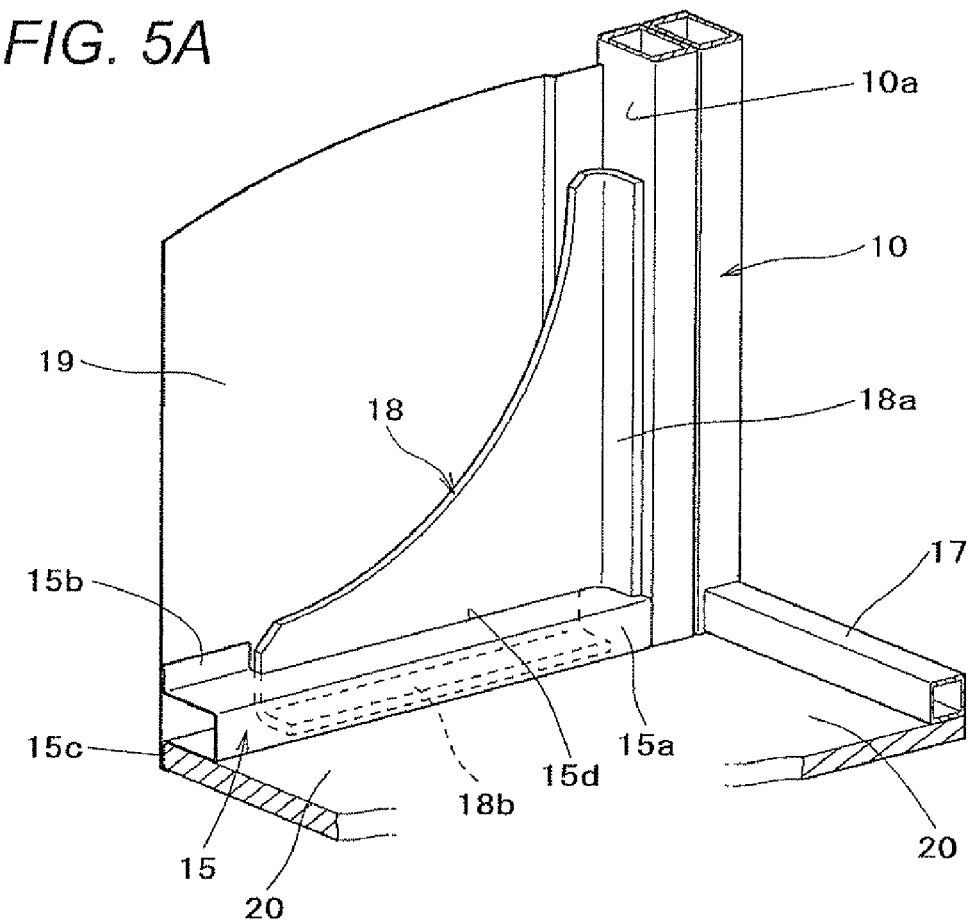
FIG. 5A is an enlarged partial perspective view of the reinforced region of the cab framework.
Figure 5B:
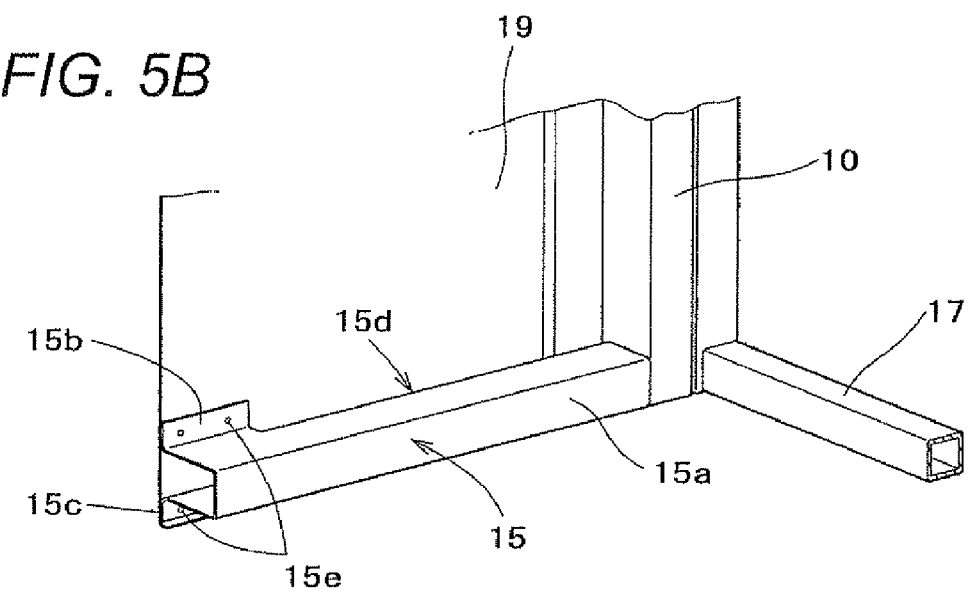
FIG. 5B is an enlarged partial perspective view showing the reinforced region of the cab framework without a reinforcing member and a floor plate.

An embodiment of the present disclosure will be discussed based on the drawings. In FIG. 1, a hydraulic shovel 1 includes a crawler-type lower traveling body 2, a bucket type working attachment 3, and an upper rotating body 4. The upper rotating body 4, which is provided with the bucket type working attachment 3, is rotatably mounted on the crawler-type lower traveling body 2, A cab 5, which will be described in more detail later, is arranged at a side of a front half portion of the upper rotating body 4 to surround and protect a cab seat 5a. An engine room 6 is arranged at a side of a rear half portion of the upper rotating body 4. A counterweight 7 is arranged at a rear end portion of the upper rotating body 4. These structures may be conventionally arranged.

A framework of the cab 5 is created by using various frame members. The various frame members are, for example, a machine body frame 8, front right and left corner portion column members 9, rear right and left corner portion column members 10, right and left upper beam members 11, a front upper beam member 12, a rear upper beam member 13, a left lower beam member 14, a right lower beam member 15, a front lower beam member 16, and a rear lower beam member 17. Erected from the machine body frame 8 are the front right and left corner portion column members 9 and the rear right and left corner portion column members 10. Bridged between upper end portions of the column members 9 and 10 are the right and left upper beam members 11, the front upper beam member 12, and the rear upper beam member 13. Bridged between lower end portions of the column members 9 and 10 are the left lower beam member 14, the right lower beam member 15, the front lower beam member 16, and the rear lower beam member 17. The cab 5 also includes plate members, window members, a door, and other necessary members that are incorporated into spatial portions of the framework. These structures may be conventionally arranged, too.

A reinforcing member 18, in which the present disclosure is carried out, is installed into a right-angled corner portion that is formed between the right column member 10 that is an example of a second frame member and the right lower beam member 15 that is an example of a first frame member of the present disclosure to which a pass-through portion 15d is formed. The right column member 10, which is made of a square tube steel material, is thicker than the right lower beam member 15 to increase strength of the right column member 10. The right lower beam member 15, which is thinner, is made of a steel material and cross-sectionally hat-shaped. The right lower beam member 15 includes a U-shaped main body 15a, an upper extending piece 15b, and a lower extending piece 15c. The upper and lower extending pieces 15b and 15c respectively extend in an upper and lower direction from an upper and lower open end edge of the main body 15a. A side plate 19 is attached to be fixed between the right column members 9 and 10. The right lower beam member 15 is integrated with the side plate 19 by welding 15e of the upper and lower extending pieces 15b and 15c to the side plate 19.

The reinforcing member 18 is a right-angled triangle, which is installed into the right-angled corner portion formed between the right column member 10 and the right lower beam member 15, as discussed above. The reinforcing member 18 is also arranged into surface contact with the side plate 19. The reinforcing member 18 also includes first and second bent surface portions 18a and 18b. The first and second bent surface portions 18a and 18b are respectively formed at an upper and lower side of the reinforcing member 18. A right-angled portion of the reinforcing member 18 is positioned between the upper side and the lower side of the reinforcing member 18. The first and second bent surface portions 18a and 18b are also bent (extended) to be orthogonal to a plate surface of the reinforcing member 18. Into surface contact with a front surface 10a of the right column member 10, the first bent surface portion 18a is welded to the right column member 10. The reinforcing member 18 is thus integrated with the right column member 10.

The second bent surface portion 18b of the reinforcing member 18, which is an example of a bent surface portion of the present disclosure, passes through the right lower beam member 15 into surface contact with a lower plate, which is an example of a second side surface portion, of the main body 15a. The reinforcing member 18 can pass therethrough because the pass-through portion 15d, which is a notch in the present embodiment and may alternatively be a penetrating hole, is formed to an upper plate, which is an example of a first side surface portion, of the main body 15a and the upper extending piece 15b. The second bent surface portion 18b of the reinforcing member 18 passes through the pass-through portion 15d, enters an interior of the main body 15a, and is arranged into surface contact with an inner surface (upper surface) of the lower plate of the main body 15a.

The cab 5 also includes a floor plate (bottom plate) 20. The floor plate 20 is covered and assembled by the framework in a state where the cab seat 5a and other various members and devices are mounted on the floor plate 20. The floor plate 20 and the framework are integrated by fixing necessary regions with bolts to form the cab 5 with the floor plate 20. An upper surface of the floor plate 20 is arranged into surface contact with a lower surface of the lower plate of the main body 15a. The second bent surface portion 18b of the reinforcing member 18 is supported by the floor plate 20 that is thicker and stronger, between which the lower plate of the main body 15a lies.

With the embodiment of the present disclosure arranged as discussed above, when a load acts in a direction of decreasing an angle between the right column member 10 and the right lower beam member 15, one side of the reinforcing member 18, at which the second bent surface portion 18b that passes through the right lower beam member 15 is formed, is supported by the thicker floor plate 20 via a lower side surface portion, which is opposite to an upper side surface to which the pass-through portion 15d is formed. The right lower beam member 15 is protected and prevented from being buckled even if the right lower beam member 15 is made of a thinner hollow material and has lower strength. The cab 5 is thus increased in strength.

Further, the right lower beam member 15 is prevented from being buckled by effectively using the floor plate 20, which is one of the components of the cab. No additional reinforcing plate is needed. Buckling prevention for a lower beam member is achieved without increasing a number of components.

Further, the floor plate 20 supports a wide surface of the second bent surface portion 18b of the reinforcing member 18, which allows load stress to be dispersed. The cab can thus achieve further strength.

Of course, the present disclosure is not restricted to the embodiment as discussed above. The present disclosure may also be carried out between other adjacent frame members that form the cab framework. For example, the present disclosure is applied to adjacent frame members at both sides instead of either one of the sides of the framework.

The present disclosure is applied to strengthen a cab in a construction machine such as a hydraulic shovel, a wheel loader, etc.

The invention claimed is:

1. A cab in a construction machine, the cab comprising:
   frame members including a hollow first frame member connected to a second frame member in order to form a corner portion, the first frame member including a pass-through portion formed at a first side surface portion of the first frame member;
   a reinforcing member that is installed at the corner portion, wherein at least one of two sides of the reinforcing member, which contact with the first frame member and the second frame member, passes through the pass-through portion and abuts against an inner surface of a second side surface portion of the first frame member that is at an opposite side of the first side surface portion; and
   a reinforcing plate that abuts against an outer surface of the second side surface portion, wherein the at least one of two sides of the reinforcing member is supported and reinforced by the reinforcing plate,
   wherein the at least one of two sides of the reinforcing member includes a bent surface portion that is orthogonally bent from a plate surface of the reinforcing member and is in contact with the second side surface portion.

2. A cab in a construction machine, the cab comprising:
   frame members including a hollow first frame member connected to a second frame member in order to form a corner portion, the first frame member including a pass-through portion formed at a first side surface portion of the first frame member:

a reinforcing member that is installed at the corner portion, wherein at least one of two sides of the reinforcing member, which contact with the first frame member and the second frame member, passes through the pass-through portion and abuts against an inner surface of a second side surface portion of the first frame member that is at an opposite side of the first side surface portion: and a reinforcing plate that abuts against an outer surface of the second side surface portion, wherein the at least one of two sides of the reinforcing member is supported and reinforced by the reinforcing plate, wherein:

wherein the at least one of two sides of the reinforcing member includes a bent surface portion that is orthogonally bent from a plate surface of the reinforcing member and is in contact with the second side surface portion, the reinforcing plate is a floor plate, the first frame member is a lower beam member that contacts with the floor plate from an upper side of the floor plate, and the second frame member is a column member that erects from the floor plate.

3. A cab in a construction machine, the cab comprising:

frame members including a hollow first frame member connected to a second frame member in order to form a corner portion, the first frame member including a pass-through portion formed at a first side surface portion of the first frame member;

a reinforcing member that is installed at the corner portion, wherein at least one of two sides of the reinforcing member, which contact with the first frame member and the second frame member, passes through the pass-through portion and abuts against an inner surface of a second side surface portion of the first frame member that is at an opposite side of the first side surface portion; and a reinforcing plate that abuts against an outer surface of the second side surface portion, wherein the at least one of two sides of the reinforcing member is supported and reinforced by the reinforcing plate, wherein both sides of the reinforcing member include a bent surface portion that is orthogonally bent from a plate surface of the reinforcing member.

* * * * *

UNITED STATES PATENT AND TRADEMARK OFFICE
CERTIFICATE OF CORRECTION

| | | |
|---|---|---|
| PATENT NO. | : 8,267,467 B2 | Page 1 of 1 |
| APPLICATION NO. | : 13/265261 | |
| DATED | : September 18, 2012 | |
| INVENTOR(S) | : Takaoka et al. | |

It is certified that error appears in the above-identified patent and that said Letters Patent is hereby corrected as shown below:

In the Specification

Column 2, line 51, delete "body 2," and insert -- body 2. --.

In the Claims

Column 5, line 3, in Claim 2, delete "frame member:" and insert -- frame member; --.

Column 5, line 10, in Claim 2, delete "surface portion:" and insert -- surface portion; --.

Column 5, line 15, in Claim 2, delete "wherein the at least" and insert -- the at least --.

Signed and Sealed this
Eleventh Day of August, 2015

Michelle K. Lee
*Director of the United States Patent and Trademark Office*